(No Model.)

T. McDONOUGH.
BUTTON HOLE CUTTER.

No. 245,966. Patented Aug. 23, 1881.

Witnesses:
Sam'l Nelson White
Samuel Lea

Inventor:-
Thomas McDonough
per Geo. J. Raw.
Attorneys.

UNITED STATES PATENT OFFICE.

THOMAS McDONOUGH, OF MONTCLAIR, NEW JERSEY.

BUTTON-HOLE CUTTER.

SPECIFICATION forming part of Letters Patent No. 245,966, dated August 23, 1881.

Application filed May 7, 1881. (No model.)

*To all whom it may concern:*

Be it known that I, THOMAS McDONOUGH, a citizen of the United States, residing at Montclair, in the county of Essex and State of New Jersey, have invented an Improvement in Button-Hole Cutters, of which the following is a full, clear, and exact description, reference being had to the accompanying drawings, making a part of this specification.

My invention consists in the production of a reliable, convenient, and inexpensive instrument for cutting button-holes in any fabric, and in the combination and arrangement of the operating parts thereof, as described and claimed.

Figure 1:
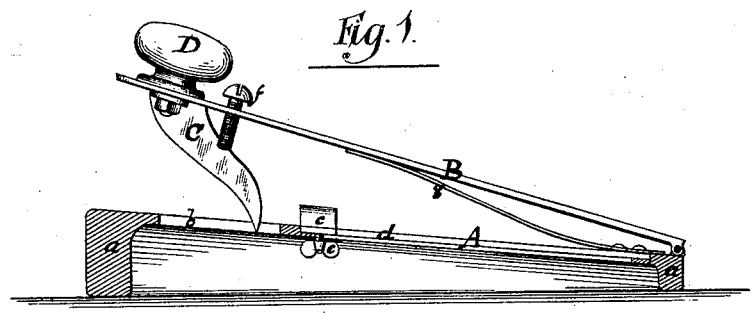
Figure 2:
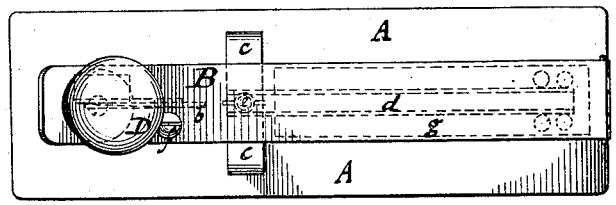

Figure 1 is a vertical section of the instrument. Fig. 2 is a plan view of the same.

A represents the bottom plate of the instrument, upon which is placed and rests the material or article in which a button-hole is to be cut. This plate is elevated or raised somewhat by means of supports *a a* at either end, or any suitable or convenient device for such purpose, so as to allow the cutter to pass freely down through the plate A. This plate, however, need be elevated only at the end at or near which the cutter operates. Through this plate is a long narrow opening, *b*, into and through which the cutter passes; and it has also fixed to it a movable stop or gage, *c*, which moves in a recess or slot, *d*, and can be fixed at any place therein by means of a thumb-screw, *e*, or any convenient fastening. Against this stop or guide *c* the edge of the cloth is rested, and by it the distance of the button-hole from the edge of the cloth is governed and regulated.

Connected to the plate A is an arm, B, to the under side of which is fixed the cutter C, which is a thin pointed blade the cutting-edge of which is preferably a little curved. This blade, as the arm B is depressed, passes into and through the cloth and into the slit or opening *b* in the plate A, thus cutting the button-hole. To the arm B is also fixed an adjustable stop, *f*, which can be regulated as to length so as to control or measure the extent of downward movement of the arm B, and thereby govern or define the length of the hole to be cut. This stop *f* is attached to the arm B, its purpose being to govern the extent of movement of the cutter, and thereby regulate the length of the hole to be cut. A spring, *g*, carries back or upward the arm B and cutter when pressure is removed from the top of the arm. A round knob, D, on the top of the arm B, furnishes a convenient mode of pressing down the arm and cutter, and thus cutting the button-hole.

The drawings show the arm B, which carries the cutter, as hinged to the plate A; but these parts may be made of one and the same piece, and such arm may be made of spring-steel, so as to secure the effect of the spring *g*.

Button-hole cutters designed to be used separately or disconnected from other mechanism, as heretofore constructed and used, have been made with levers or handles pivoted together and working like shears, and are therefore not easily and conveniently operated when thick and heavy, or firm, solid material, as heavy cloth or felt or leather, has to be cut. By attaching the cutting-blade to the end of a lever, B, fitted with a knob, D, or its equivalent, so that a blow by the hand or otherwise can be given upon the blade, the cut is effected much more easily and with greater certainty, and thick or heavy substances can be cut as readily as thinner material.

The cutting-blade C is also peculiarly constructed and shaped, having its knife or cutting edge only on its front side, and thus cuts the hole only in one direction, and is so shaped and attached to its supporting-lever that its piercing-point is at one end of the button-hole, and is always the limit of the hole in one direction. The measured distance of the point of the cutter from the guide *c* will thus correspond with the required distance of the button-hole from the edge of the material. The shape of the cutter also secures an easier cut as the cutter is forced down.

The stop *f* not only limits the extent of the movement of the lever B, but is so placed that it comes down upon the cloth or material to be cut, and thus the same length of cut is secured, whatever may be the thickness or character of the material.

The blade C is also so attached to the lever

B that it can be readily detached for convenience of sharpening, &c.

What is claimed is—

A button-hole cutter having a base-plate, A, slotted and elevated at its slotted end for the purpose set forth, and provided with a gage, c, in combination with a detachable cutter, C, constructed and operating as described, and a stop, f, acting upon the surface of the cloth, both arranged upon and attached to a spring-lever, B, having a knob, D, or its equivalent, for operating the same, the whole constructed and arranged substantially as and for the purposes set forth.

THOMAS McDONOUGH.

Witnesses:
SAML. NELSON WHITE,
SAMUEL LEA.